(No Model.)
F. V. JONES & J. G. JARVIS.
MAKING HOLLOW FORMS FROM PLASTIC MATERIALS.
No. 368,591. Patented Aug. 23, 1887.
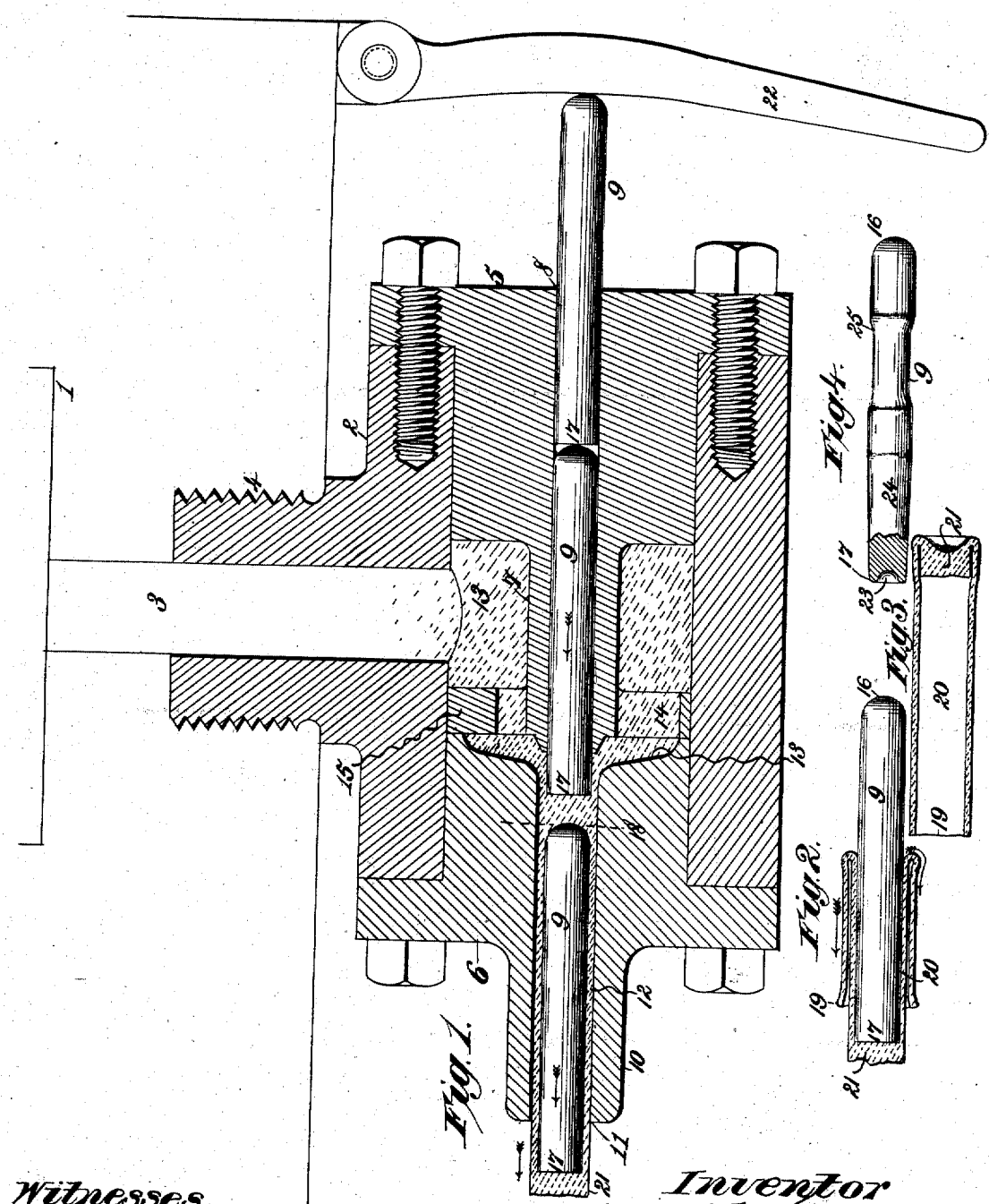

UNITED STATES PATENT OFFICE.

FREDERICK V. JONES AND JOHN G. JARVIS, OF ADAMS, MASSACHUSETTS, ASSIGNORS TO THE AMERICAN ZYLONITE COMPANY, OF NEW YORK, N. Y.

MAKING HOLLOW FORMS FROM PLASTIC MATERIAL.

SPECIFICATION forming part of Letters Patent No. 368,591, dated August 23, 1887.

Application filed October 14, 1886. Serial No. 216,265. (No model.)

*To all whom it may concern:*

Be it known that we, FREDERICK V. JONES and JOHN G. JARVIS, citizens of the United States, residing at Adams, in the county of Berkshire and State of Massachusetts, have invented new and useful Improvements in Making Hollow Forms from Plastic Material for the Manufacture of Various Articles, of which the following is a specification.

In the manufacture of hollow articles from plastic materials by heat and pressure applied to their interiors, to thereby bring them into the shape desired within suitable molds—as, for example, as disclosed by Letters Patent No. 178,479, issued to Smith and Grasser, June 6, 1876—it becomes necessary to first produce the hollow form with one end closed, to be subsequently fashioned into the desired shape in a mold; and to effect the production of the hollow forms with one end closed in a rapid, convenient, economical, and efficient manner are the objects of our invention, to which end it consists in the method of making a hollow form with one end solid and closed by a part integral with the main body by successively incasing a series of separate mandrels with a mass of plastic material, transversely severing the mass at a distance from one end of each mandrel to leave the closed end to the form, and then removing the form from the mandrel.

The invention also consists in the method of making hollow forms from plastic materials—such as have a pyroxyline base—by successively introducing a series of independent polished mandrels into a mass of flowing or moving plastic material, thereby entirely enveloping each mandrel, including both its ends, subsequently transversely severing the moving mass of plastic material at a distance from one end of each mandrel to provide a body of the material between such end of the mandrel and the point where the material is transversely severed, and then removing the material from the mandrel to provide a hollow form having a closed end suitably prepared to be fashioned by molds and pressure into any desired article.

The invention also consists in an apparatus for making hollow forms from plastic materials, comprising a casing having means to connect it with a stuffing-machine—such as is employed for ejecting zylonite and other pyroxyline compounds in various forms—said casing constructed with two separated bores of different diameters and having open ends, the larger bore having a countersunk inner end communicating with a chamber through a perforated diaphragm in the casing, to receive and conduct out the pyroxyline compound forced thereinto by the stuffing-machine, and the smaller bore extending at its inner end through the perforated diaphragm, and serving to introduce a series of independent mandrels into and entirely through the said larger bore to be entirely incased or enveloped, and caused to travel along and out of the larger bore by the plastic material flowing or moving therethrough.

The invention also consists in other features, all of which will be fully hereinafter described and claimed, reference being made to the accompanying drawings, in which—

Figure 1 is a longitudinal central sectional view of an apparatus embodying our invention, and showing the manner of incasing or enveloping the mandrels; Fig. 2, a detached view of one of the mandrels, showing the method of removing the hollow form of plastic material therefrom; Fig. 3, a detached view of one of the hollow forms after being removed from a mandrel, and Fig. 4 a detail view showing a modification in the construction of the mandrels.

In order to enable those skilled in the art to make and use our invention, we will now describe the same in detail, referring to the drawings, where—

The numeral 1 indicates part of a stuffing machine or cylinder, in which the plastic material—such as zylonite or other pyroxyline compound— is maintained in a soft condition by heat applied in the usual or any suitable manner. The apparatus or nozzle comprises a casing, 2, connected with the discharge-orifice 3 of the stuffer, as by a screw-neck, 4. The casing consists of a hollow cylinder having inserted in its ends two metal plugs, 5 and 6, bolted or otherwise secured in place, the one, 5, having a contracted neck, 7, and an unobstructed smooth bore, 8, open at both ends, for receiving and conducting the polished mandrels 9, which are made of suitable metal and accurately fit said bore. The other plug, 6, has a contracted neck, 10, extended outwardly, and is furnished with a smooth bore, 11, open at both ends, to receive and conduct therethrough the flowing or moving mass of plastic material, which is indicated by the broken lines, as at 12. The bore 11 is somewhat larger in diameter than the bore 8, and is countersunk at its inner end, as at 13, to cause the plastic material to freely and smoothly glide or flow into the enlarged bore 11 without obstruction or liability of choking. The casing between the inner ends of the plugs constitutes a distributing-chamber, 13, for the plastic material, to uniformly distribute the latter through perforations or passages 14 in a diaphragm, 15, located in the casing adjacent to the countersunk end of the bore 11. The neck 7 of the plug 5 extends centrally through the said distributing-chamber and diaphragm, and is furnished with a beveled mouth located in alignment with the other bore, whereby the plastic material forced from the stuffer is distributed around the said neck in the distributing-chamber and caused to flow through the diaphragm into the larger bore 11, the constant feed of the material causing it to flow or move through the bore 11 and out of the discharge-mouth thereof.

In operation the smooth cylindrical mandrels 9, having conical or rounded ends 16, are successively introduced into the mandrel receiving and conducting bore 8, and are moved therein until their squared ends 17 are acted upon by the flowing or moving plastic mass, whereupon the mandrel will be automatically carried along through the bore 11 and be incased or enveloped by the plastic material. The action of the flowing mass upon the mandrel is such as to advance it somewhat more rapidly than the succeeding mandrel in the bore 8, whereby both ends of the mandrel will also be covered by a body of the plastic material, as shown in Fig. 1. As the enveloped or incased mandrels emerge the moving mass of material is severed transversely on the line 18 by a knife or shears in the hands of an attendant, or by other contrivances, at such a point as will provide a body of the plastic material of more or less depth or bulk, as desired, between the rounded end of each mandrel and the point where the material is severed transversely. It now becomes necessary to remove the form from the mandrel, which should be effected before the plastic material sets or hardens, and this we accomplish rapidly and efficiently by taking hold of the open end 19 of the form at the exposed rounded end of the mandrel and turning its inside to the outside in the act of stripping it from the mandrel, in a manner similar to turning a tight glove inside out when removing it from the hand. The result is a hollow form, 20, having one end closed by a body, 21, of the plastic material integral with the side or wall of the form, all of which is effected rapidly, conveniently, and efficiently at minimum expense and without loss of time and subsequent manipulation by skilled labor. A guide for transversely severing the plastic material resides in the slight depression in the mass of material, which arises by reason of the rounded or conical ends of the mandrels. The material is severed at this depression or line of demarkation, so that there will always be present a body, as 21, to constitute the closed end of the hollow form.

The severing of the material leaves a rugged end; but by turning the form inside out in the act of removing or stripping it from the mandrel such rugged end is placed inside the form, to be distributed when the form is placed in molds of suitable pattern, and thereby fashioned into the desired article—such, for instance, as a handle for a whisk-broom, a shaving-brush, a cane, an umbrella, or any other purpose.

In practice, mandrel after mandrel is introduced in the mandrel receiving and conducting bore, and to advance the inserted mandrels until the feeding action of the flowing or moving mass of plastic material commences to act upon the innermost mandrel a pivoted swinging lever, 22, or other device may be employed. The squared end of each mandrel may be provided with a cavity, 23, Fig. 3, to gather a sufficient body or quantity of the plastic material thereinto at the closed end of the hollow form, for the purpose of filling out any extended end impression in the mold or die, the point produced by pressing out the said gathered body finally becoming the closed end of and integral with the finished article. The mandrels may be of any shape in cross-section—such as triangular or polygonal—but in all instances should accurately fit the mandrel receiving and conducting bore 8. The mandrels shown in Figs. 1 and 2 are true cylinders, while in Fig. 3 the mandrel 9 is tapering, as at 24.

To increase the thickness of the side or wall of the form, the mandrel may be recessed, as at 25.

It will be understood that the difference in diameter between the two bores will vary according to the thickness desired in the side or wall of the hollow form. If mandrels are to be incased or enveloped very thinly with the plastic material, the bore 11 will be accordingly reduced in diameter, and conversely.

It should be stated that the smooth polished exterior surfaces of the mandrels are very important, in that they provide the hollow forms, when turned inside out, with smooth outer surfaces, which places them in the very best condition for the molding process.

It is common in the art of applying plastic compounds to mandrels for forming open-ended tubes to flow the plastic mass upon and around a traveling continuous core in the nozzle of a stuffing-machine; but such is not our invention, which differs from prior methods in several important features, in that we produce a hollow form having the closed end integral therewith and produced during the stop of cringing the plastic mass into hollow form.

Further, we apply the flowing or moving mass successively to a series of mandrels traveling through and from a bore and sever the mass transversely at a distance from one end of each mandrel to leave the closed end to the hollow form.

Having thus described our invention, what we claim is—

1. The method of making hollow forms with one end closed and integral therewith from a plastic material, which consists in successively incasing or enveloping the mandrels with the plastic material, including both ends thereof, successively severing the plastic material at a distance from one end of each mandrel to provide the closed end to the form, and then removing the form with its closed end from the mandrel, substantially as set forth.

2. The method of making a hollow form with a closed end integral therewith from plastic material, which consists in incasing or enveloping the mandrel with said material, including one end of the mandrel, and then turning the form inside out in the act of stripping it from the mandrel, substantially as set forth.

3. The method of making hollow forms from plastic material, which consists in successively enveloping a series of independent mandrels, including their ends, with the plastic material, severing the material between the adjacent ends of each pair of mandrels to provide the form on each mandrel integral with a closed end, and then removing the forms from the mandrels, substantially as set forth.

4. The method of making hollow forms from plastic material, which consists in causing traveling mandrels to successively enter a mass of flowing or moving plastic material and transversely severing the material at a distance from one end of each mandrel to provide a body of the material between such end of the mandrel and the point where the material is transversely severed, thereby producing a hollow form having a closed end integral therewith, substantially as set forth.

In testimony whereof we affix our signatures in presence of two witnesses.

F. V. JONES.
J. G. JARVIS.

Witnesses:
H. H. SCHÜRMANN,
HY SCHAMBURG.